(12) United States Patent
O et al.

(10) Patent No.: US 11,846,066 B2
(45) Date of Patent: Dec. 19, 2023

(54) ANTI-PILLING MERINO WOOL FABRIC, GARMENTS COMPRISING THEREOF, AND METHOD OF FABRICATION THEREOF

(71) Applicant: Nano and Advanced Materials Institute Limited, Hong Kong (HK)

(72) Inventors: Wing Nien Wylie O, Hong Kong (HK); Tsz Hin Yui, Hong Kong (HK); Ka Yim Yeung, Hong Kong (HK); Chi Yin Leung, Hong Kong (HK); Chenghe Dong, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 186 days.

(21) Appl. No.: 17/391,019

(22) Filed: Aug. 1, 2021

(65) Prior Publication Data
US 2023/0035011 A1  Feb. 2, 2023

(51) Int. Cl.
| | |
|---|---|
| *C08G 18/16* | (2006.01) |
| *C08G 18/24* | (2006.01) |
| *C08G 18/73* | (2006.01) |
| *C08G 18/75* | (2006.01) |
| *C08G 18/72* | (2006.01) |
| *C08G 18/48* | (2006.01) |
| *D06N 3/00* | (2006.01) |
| *C09D 175/08* | (2006.01) |
| *D06M 13/395* | (2006.01) |
| *D06M 15/564* | (2006.01) |
| *D06M 15/568* | (2006.01) |
| *D06M 23/10* | (2006.01) |
| *C08G 18/02* | (2006.01) |
| *C08G 18/28* | (2006.01) |
| *C08G 18/70* | (2006.01) |
| *D06M 101/10* | (2006.01) |
| *D06N 3/14* | (2006.01) |

(52) U.S. Cl.
CPC .......... *D06N 3/147* (2013.01); *C08G 18/025* (2013.01); *C08G 18/161* (2013.01); *C08G 18/168* (2013.01); *C08G 18/246* (2013.01); *C08G 18/283* (2013.01); *C08G 18/4833* (2013.01); *C08G 18/706* (2013.01); *C08G 18/722* (2013.01); *C08G 18/73* (2013.01); *C08G 18/755* (2013.01); *C09D 175/08* (2013.01); *D06M 13/395* (2013.01); *D06M 15/564* (2013.01); *D06M 15/568* (2013.01); *D06M 23/10* (2013.01); *D06N 3/0015* (2013.01); *D06M 2101/10* (2013.01); *D06M 2200/35* (2013.01); *D06N 2201/06* (2013.01); *D06N 2209/105* (2013.01); *D06N 2211/10* (2013.01); *D10B 2211/02* (2013.01); *D10B 2501/00* (2013.01)

(58) Field of Classification Search
CPC .... D06M 15/00; D06M 13/00; D06M 13/395; D06M 15/564; D06M 15/568; D06M 23/10; D06M 2101/10; D06M 2200/35; Y10T 442/20; C08G 18/025; C08G 18/161; C08G 18/168; C08G 18/246; C08G 18/283; C08G 18/4833; C08G 18/706; C08G 18/722; C08G 18/73; C08G 18/755; C08G 2115/06; C08G 18/797
See application file for complete search history.

(56) References Cited

U.S. PATENT DOCUMENTS

| | | | | |
|---|---|---|---|---|
| 2001/0029272 A1* | 10/2001 | Schwalm | ............. | C09D 175/16 522/78 |
| 2020/0362508 A1* | 11/2020 | Coppens | ............. | C08G 18/6229 |

FOREIGN PATENT DOCUMENTS

| | | | | | |
|---|---|---|---|---|---|
| CN | 105133327 A | * | 12/2015 | | |
| CN | 105544196 B | * | 12/2017 | .......... | D06M 13/188 |
| CN | 111535038 A | * | 8/2020 | | |
| CN | 111535038 A | | 8/2020 | | |
| WO | WO-2012165477 A1 | * | 12/2012 | ............... | D01D 5/04 |
| WO | 2018109956 A1 | | 6/2018 | | |

OTHER PUBLICATIONS

Office Action of corresponding Japan Patent Application No. 2021-180129 dated Feb. 1, 2023.

* cited by examiner

*Primary Examiner* — Jennifer A Steele (74) *Attorney, Agent, or Firm* — Idea Intellectual Limited; Margaret A. Burke; Sam T. Yip (57) ABSTRACT

The present invention provides an anti-pilling wool fabric with a coating having pilling resistance and resistance to fiber loss from fabric surface. The coating is formed by a coating formulation including at least two diisocyanates, at least two catalyst, a water dispersing agent, a buffer and water, which provides a polycarbodiimide crosslinker reactive to the relative less reactive groups on polypeptide of the wool fabric and promotes crosslinking between polypeptides of the wool fabric under relatively mild processing conditions so as to enhance mechanical strength of the wool fabric whilst no significant effect of the original finish merino wool fabric and/or garment and fiber loss from fabric surface are observed, compared to conventional treatment methods on wool fabric. A corresponding coating formulation and method of fabricating the anti-pilling wool fabric are also provided. The present invention is applicable to finished wool fabric which fibers are already with colorant(s), and/or dye(s), and/or reactive dye(s).

20 Claims, 6 Drawing Sheets

ANTI-PILLING MERINO WOOL FABRIC, GARMENTS COMPRISING THEREOF, AND METHOD OF FABRICATION THEREOF

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention provides an anti-pilling merino wool fabric. In particular, it provides an anti-pilling merino wool fabric with pilling resistance of at least 4 according to JIS L1076 ICI method and with fiber loss of less than 0.2% w/w upon home laundry for 15 cycles without the use of laundry net. Related method of fabrication and garment comprising thereof are also provided.

BACKGROUND

Animal fibers such as those of merino wool are relatively weaker in tensile strength in comparison to synthetic fibers, such as polyester, and are susceptible to fiber breakage. Fabrics comprising wool fibers are vulnerable to fiber loss from fabric surface during wear or laundry to form fuzz. In addition, the presence of cuticle scale on merino wool fiber surface will further lead to difference in friction coefficients between fibers. The presence of mechanical actions, including washing, rubbing and abrasion, to wool fabric surface shall cause directional movement of fibers, allowing fuzz entanglement into pills, and aggregated pills will eventually wear off from merino wool fabric surface.

To alleviate fiber loss and pilling from the surface of merino wool fabric, conventional solutions mainly involve reducing fiber loss and entanglement of fuzz and aggregation of pills, reducing inter-fibers friction, and to increase mechanical strength of fiber. In particular, these methods include enzymatic treatment to remove small and short loose fibers from fabric surface, plasma treatment to reduce inter-fibers friction, and use of polyacrylate-based coating on the wool fiber to increase the mechanical strength of wool fiber so as to reduce fiber loss from surface. However, these methods often come with drawbacks. For example, the use of polyacrylate-based coating is not applicable to finished merino wool fabric and/or garment and can lead to significant discoloration of the original finish. Enzymatic treatment can potentially lead to more fiber loss, as this method is not selective to only loose fiber on fabric surface. Plasma treatment found hurdles at industrialization.

Therefore, there is a need for a new merino wool fabric comprising coated fibers with improved mechanical properties, while pilling and fiber loss from surface are avoided.

SUMMARY OF THE INVENTION

Accordingly, one aspect of the present invention provides an anti-pilling merino wool fabric with pilling resistance of at least 4 and less than 0.2% w/w of fiber loss upon home laundry for 15 cycles without the use of laundry net, the anti-pilling merino wool fabric being coated with a formulation. The formulation includes approximately 8 to 30% w/w polymer binder in water and approximately 70 to 92% w/w buffer in water, wherein the polymer binder comprises at least two diisocyanates, at least two catalysts, and a water dispersing agent.

In a preferred embodiment, the pilling resistance of the present wool fabric is determined according to JIS L1076 ICI method.

In an embodiment of the first aspect of the present invention, the at least two diisocyanates comprise isophorone diisocyanate and 1,6-hexamethylene diisocyanate.

In a specific embodiment, isophorone diisocyanate and 1,6-hexamethylene diisocyanate are in a mole ratio of 4:1.

In an embodiment of the first aspect of the present invention, the at least two catalysts comprise 3-methyl-1-phenyl-2-phospholene-1 oxide and dibutyltin(IV) dilaurate.

In a specific embodiment, 3-methyl-1-phenyl-2-phospholene-1 oxide is at a mole concentration of approximately 0.2 to 1.0% with respect to the at least two diisocyanates.

In another specific embodiment, dibutyltin(IV) dilaurate is at a concentration of approximately 0.01% w/w with respect to the water dispersing agent.

In one embodiment, the water dispersing agent is one or both of polyethylene glycol monomethyl ether 350 and polyethylene glycol monomethyl ether 550.

In one embodiment, the buffer is selected from phosphate or borate; the buffer is adjusted to approximately pH 8.0.

The present formulation introduces a polycarbodiimide cross-linker to the less reactive carboxylic groups that are present on fibers of the merino wool fabric. The polycarbodiimide polymer chain of the said cross-linker is also tunable by adjusting ratio of different monomers, catalyst added and/or reaction conditions, which increases the flexibility of the formulation. The present formulation can be completely cured at room temperature within hours and is easy to form a coating on existing merino wool fabric.

A second aspect of the present invention provides a method of fabricating the merino wool fabric in the first aspect. The method includes:
  providing a merino wool fabric;
  preparing a coating formulation including:
    mixing a first diisocyanate and a second diisocyanate in a first mole ratio with a first catalyst at a second mole ratio with respect to the first and second diisocyanates to form a first solution,
    adding into the first solution a water dispersing agent at a first weight percentage and a second catalyst at a second weight percentage to the total weight of the first and second diisocyanates to form a second solution,
    adding into the second solution with water followed by mixing until a homogenous solution is formed as third solution as a polymer binder in water,
    preparing a fourth solution including a buffer in water at pH 8.0,
    adding the fourth solution into the third solution by mixing until a homogenous solution is formed to obtain the coating formulation;
  applying the coating formulation to the merino wool fabric; and
  removing excess coating formulation from the merino wool fabric followed by drying.

In one embodiment, the first diisocyanate is selected from isophorone diisocyanate and the second diisocyanate is selected from 1,6-hexamethylene diisocyanate.

In a specific embodiment, the first mole ratio between the first and second diisocyanates is 4:1.

In another specific embodiment, the first catalyst is selected from 3-methyl-1-phenyl-2-phospholene-1 oxide.

More specifically, the second mole ratio of the first catalyst to the first and second diisocyanates is from approximately 0.2% to 1%

In one embodiment, the water dispersing agent is one or both of polyethylene glycol monomethyl ether 350 and polyethylene glycol monomethyl ether 550.

In a specific embodiment, the first weight percentage of the water dispersing agent is about 126% to the total weight of the first and second diisocyanates.

In one embodiment, the second catalyst is selected from dibutyltin(IV) dilaurate.

In a specific embodiment, the second weight percentage of the second catalyst is about 0.01% to the weight of the water dispersing agent.

In one embodiment, the buffer is selected from phosphate or borate salts.

In one embodiment, the first and second diisocyanates are mixed by stirring until a clear solution is obtained, followed by heating the mixture up to 160 degrees Celsius for approximately 35 to 50 minutes, and then the mixture is cooled to about 120 degrees Celsius to obtain the first solution.

In one embodiment, the second solution is obtained by first mixing the second catalyst with the water dispersing agent until a homogenous solution is formed followed by adding the homogenous solution into the first solution and stirring for about 2 hours at about 120 degrees Celsius.

In one embodiment, water is added dropwisely with stirring into the second solution after the second solution is cooled to 80 degrees Celsius until a clear homogenous solution is obtained and about 63% w/w water content in the polymer binder is reached.

In one embodiment, the fourth solution including buffer in water of at least about 70% w/w with respect to the third solution is added into the third solution followed by mixing until a homogenous solution is formed as the coating formulation.

In any one or more aspects of the present invention, the wool fabric described herein which is coated with the present coating formulation and/or fabricated according to the method described herein can be a finished wool fabric which is already dyed with colorant(s), and/or dyes, and/or reactive dye(s).

A garment including the merino wool fabric described and/or prepared by the method in any one of the aspects of the present invention is also provided, which includes but not limited to rib knit, shirt, dress, sweater, etc.

BRIEF DESCRIPTION OF THE DRAWINGS

The disclosure will become more fully understood from the detailed description given herein below for illustration only, and thus not limitative of the disclosure, wherein.

DEFINITIONS

The terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of preparation described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

"Association" or its variations described herein with respect to the interaction between different compounds, molecules and/or substances may refer to any physical, chemical and/or other possible bonding between the compounds, molecules and/or substances where such expression or term is applied.

"Water dispersing agent" described herein refers to an agent to assist the polycarbodiimide polymer to disperse in water. In particular, this agent reacts with the polycarbodiimide polymer to form "caps" on both ends of the polymer in order to render a homogenous solution of polycarbodiimide polymer in water.

In the present disclosure, "polycarbodiimide polymer" and "polycarbodiimide crosslinker" are used interchangeably to refer to a polymer which reacts with a less reactive group on the animal fiber such as finished wool fabric or garment such as a merino wool fabric or garment.

Pilling resistance of a wool fabric or garment described herein is tested and graded according to JIS L1076 ICI method. A grade of 5 indicates excellent pilling resistance, and a grade of 1 shows poor pilling resistance.

"Discoloration" of a finished wool fabric or garment described herein is graded in a grey scale grading according to ISO105-A02 against the original finished wool fabric or garment. A grade of 5 shows minimal effect to discoloration against original finish of fabric, and a grade of 1 shows significant effect to discoloration against original finish of fabric.

DETAILED DESCRIPTION

The present invention will be described in detail through the following embodiments/examples with appending drawings. It should be understood that the specific embodiments are provided for an illustrative purpose only, and should not be interpreted in a limiting manner.

Figure 1A:
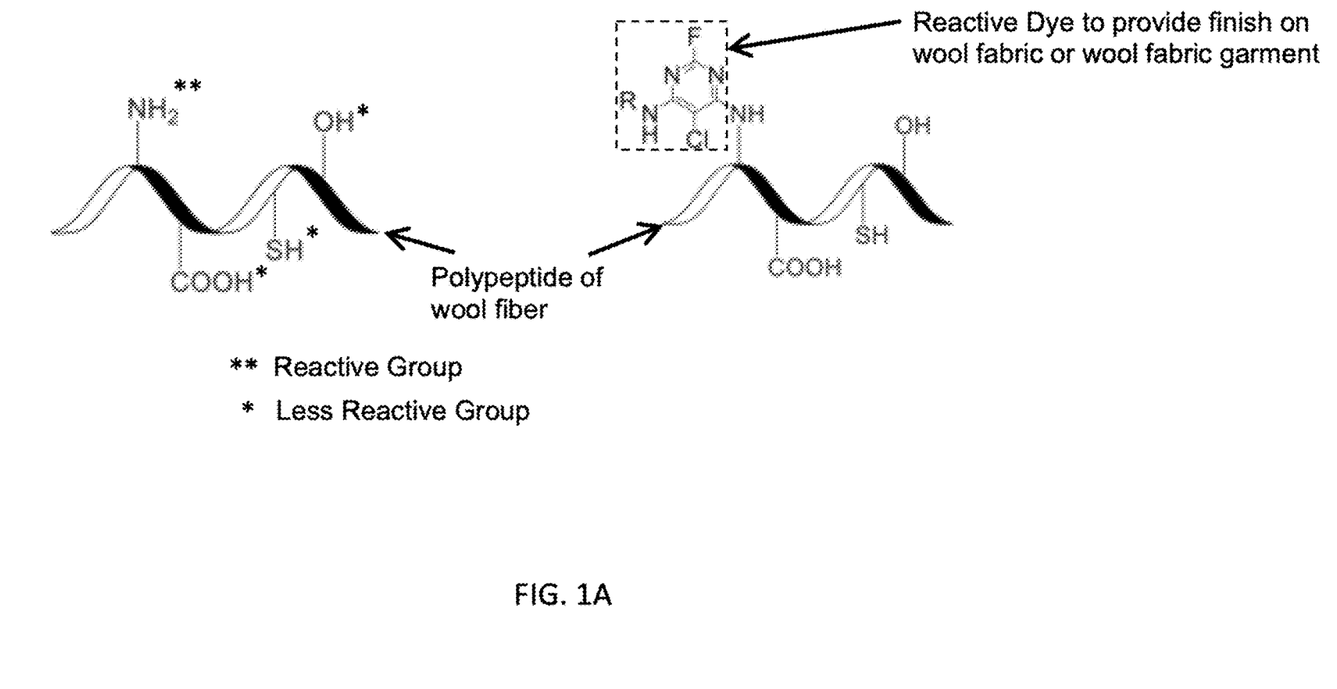
FIG. 1A schematically depicts a technical challenge of crosslinking wool fibers in the presence of reactive dye on a finished merino wool fabric and/or garment.
Figure 1B:
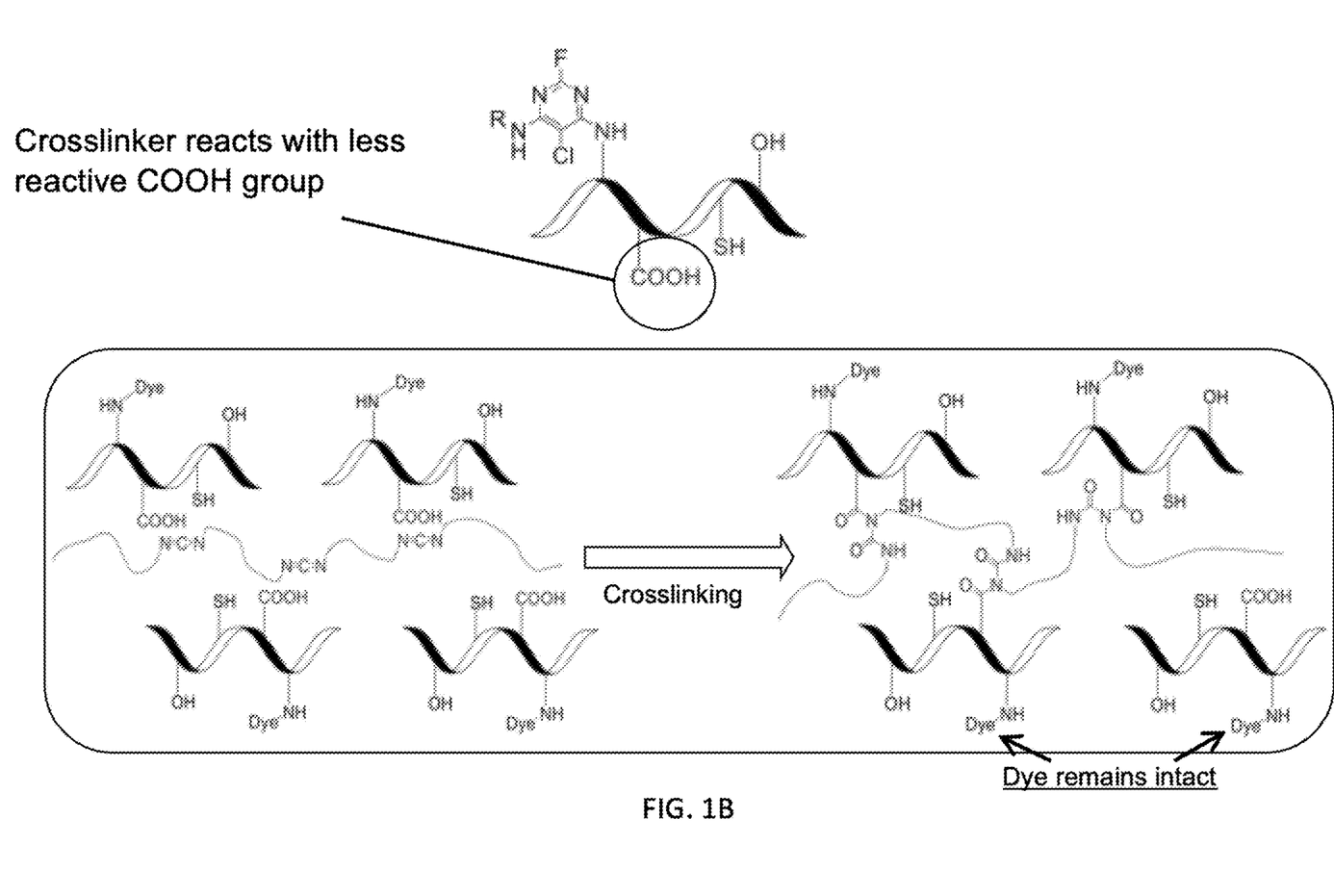
FIG. 1B schematically depicts how the present invention tackles the technical challenge in prior art depicted in FIG. 1A.
Figure 1C:
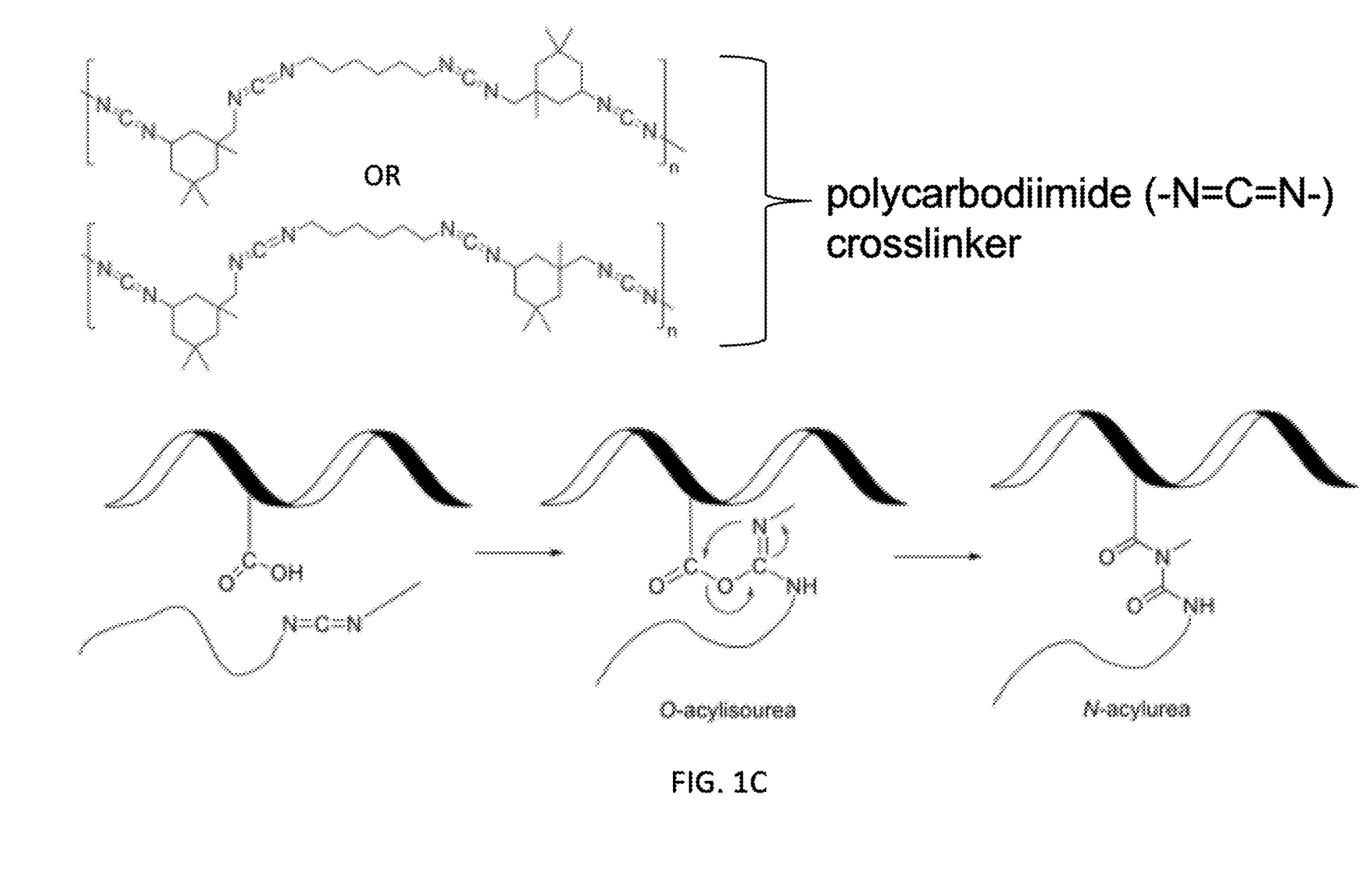
FIG. 1C schematically depicts how the present invention provides crosslinking to reactive groups on wool fabrics with reactive dye according to an embodiment of the present invention.

Turning to FIG. 1A, a typical polypeptide of a wool fiber on fabric such as the polypeptide of a merino wool fiber has reactive functional groups, and among those reactive functional groups, the amino ($NH_2$) has usually been reacted with one or more reactive dyes to provide finishing and/or coloration of the wool fabric. Thus, it makes crosslinking of the wool fiber, a method to increase the mechanical strength of wool fiber for reducing fiber loss from surface, very challenging; this surface lacks reactive functional groups to react and/or crosslink with a polymer of a protective polymer coating for improving mechanical strength of the said fiber and to reduce fiber loss and pilling from fabric surface. To tackle this technical challenge, the present invention provides a polymer for crosslinking with the polypeptide of the wool fabric at the less reactive functional groups, while the processing/reaction conditions are relatively mild and can be conducted in water. The covalent linkage between the reactive dye and of the amino group on polypeptide of wool fiber remained intact, reducing the chance of discoloration of the original finish of wool fabric and/or garment (FIG. 1B). In a preferred embodiment, a polycarbodiimide crosslinker is provided as the crosslinker which interacts with the carboxylic acid groups on the polypeptide of the wool fiber, to first forming an O-acylisourea group followed by formation of N-acylurea group, when one polypeptide crosslinks with another polypeptide via the polycarbodiimides polymer (FIG. 1C).

Figure 2:
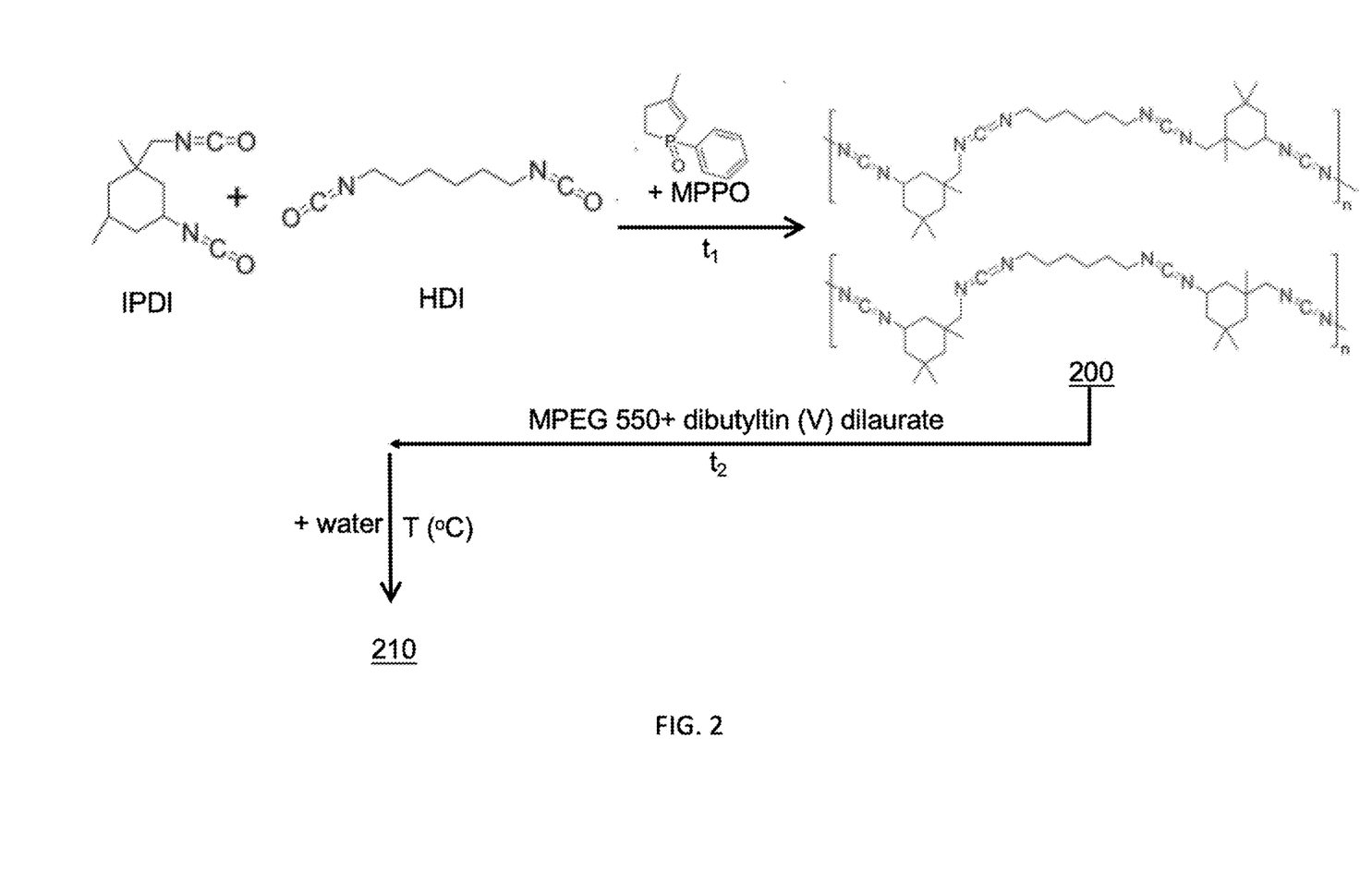
FIG. 2 schematically depicts the preparation of coating formulation.

Turning to FIG. 2, the polycarbodiimide crosslinker in the present invention is formed by reacting at least two monomers, e.g., two diisocyanates which are isophorone diisocyanate (IPDI) and 1,6-hexamethylene diisocyanate (HDI), with a first catalyst, e.g., 3-methyl-1-phenyl-2-phospholene-1 oxide (MPPO), for a first period of time ($t_1$) to form a first reaction product, (200), a polycarbodiimide polymer. After cooling, the polycarbodiimide polymer further reacts with a water dispersing agent, e.g., polyethylene glycol monomethyl ether 550 (MPEG 550), and a second catalyst, e.g., dibutyltin (IV) dilaurate, for a second period of time ($t_2$), to form a polymer binder, followed by cooling. Water is added into the polymer binder dropwisely and heated to a temperature (T1) under stirring until a homogenous solution (210) is obtained as a polymer binder in water. The homogenous solution (210) will be further mixed with a buffer solution at pH 8.0 before coating on the wool fabric.

In a preferred embodiment, $t_1$ is about 50 minutes, and the first reaction between two diisocyanates and the first catalyst is performed at about 155-160° C., more preferably at 160° C.

In another preferred embodiment, $t_2$ is about 2 hours, and the second reaction between polycarbodiimide polymer, MPEG 550 and dibutyltin (IV) dilaurate is performed at about 120° C.

In yet another preferred embodiment, T1 is about 80° C., and the homogenous solution obtained after adding the water dropwisely into the polymer binder has a final water content of about 63% w/w.

In another preferred embodiment, the above homogenous solution, polymer binder in water, is mixed with pH 8.0 phosphate or borate buffer in water in which the above solution is at least 8% of the total solution weight.

EXAMPLES

Example 1

Preparation of Coating Formulation for Merino Wool Fabric

Table 1 below summarizes composition of polymer binder in water (I) according to an embodiment of the present invention.

TABLE 1

Composition of Polymer Binder in Water (I):

| Material | Amount (vol./weight) | Moles |
|---|---|---|
| Isophorone diisocyanate (IDPI) | 55 mL/58.3 g | 0.262 mol |
| 1,6-hexamethylene diisocyanate (HDI) | 10.4 mL/10.9 g | 0.0649 mol |
| 3-Methyl-1-phenyl-2-phospholene-1 oxide (MPPO) | 0.3125 g | 1.63 mmol |
| Polyethylene glycol monomethyl ether 550 (MPEG 550) | 82 mL/87.7g | |
| Dibutyltin(IV) Dilaurate | 8.2 mg | |
| Water | 270 g | |

Preparation Procedure 1) 3-methyl-1-phenyl-2-phospholene-1 oxide (MPPO) (0.5 mol % with respect to total amount of two diisocyanates), isophorone diisocyanate (IPDI) and 1,6-hexamethylene diisocyanate (HDI) (25 mol % with respect to amount of isophorone diisocyanate or mole ratio of IPDI to HDI=4:1) were charged into a 500-mL flask with stirring until a clear solution was obtained. The solution was then heated to 160 degrees Celsius for 50 minutes ($t_1$);

2) After 50 minutes the solution was cooled to 120 degrees Celsius. Dibutyltin(IV) dilaurate (0.01% by weight against MPEG 550) was added to MPEG 550 (126% by weight against the total weight of the two diisocyanates) with stirring until a homogenous solution was obtained. The homogenous solution was added to the above cooled solution with stirring. The reaction mixture was kept stirring for 2 hours ($t_2$) at 120 degrees Celsius;

3) After 2 hours of stirring, the reaction mixture from (2) was cooled to 80 degrees Celsius (T1). Water (170% weight against the total weight of reagents added) was added dropwise with stirring until a clear homogenous solution was obtained. Final water content: 63% w/w.

Example 2

Variations in Composition and/or Preparation Condition of Polymer Binder Formulations Table 2 below summarizes three other embodiments (namely compositions of polymer binder in water (II), (III) and (IV)) apart from composition of polymer binder in water (I) described in Example 1:

TABLE 2

| Compositions of Polymer Binder in Water | MPEG | $t_1$/min | $t_2$/h | T1/° C. |
|---|---|---|---|---|
| (I) | 550 | 50 | 2 | 80 |
| (II) | 350 | 35 | 17 | 60 |
| (III) | 550 | 50 | 2 | 60 |
| (IV) | 550 | 50 | 17 | 80 |

Example 3

Other Variations in Polymer Binder Fabrication

Table 3 below summarizes other variations in the fabrication of polymer binder comprising polyethylene glycol monomethyl ether 350 (MPEG 350).

TABLE 3

| Entry | MPPO/x mol % | $t_1$/min | MPEG | $t_2$/h | T1/° C. |
|---|---|---|---|---|---|
| 1 | 0.5 | 35 | MPEG 350 | 17 | 60 |
| 2 | 0.5 | 20 | | | |
| 3 | 1 | 20 | | | |
| 4 | 0.2 | 45 | | | |

Example 4

Pilling Resistance of Merino Wool Fabric with Different Coating Formulations In this example, about 8% w/w of composition of polymer binder in water (I) to (IV) from Examples 1 and 2 were added with about 92% w/w of phosphate buffer solution or borate buffer at pH 8.0 before soaking a merino wool fabric of 2×2 rib stitch into each of the coating formulations.

Under laboratory conditions, the said merino wool fabric was soaked into 350 mL of coating formulations at room temperature or 25 degrees Celsius with agitation in wash fastness tester for 30 minutes. Each fabric was then padded with a laboratory wringer (at about 10 lbs) to remove excess solution, followed by tumble dry at 80 degrees Celsius for 30 minutes. Each fabric was then line dried for 48 hours at ambient conditions, and ironed, prior to being tested.

Table 4 below summarizes the pilling resistance result according to JIS L1076 ICI method.

TABLE 4

| Entry | Compositions of Polymer Binder in Water | pH 8 Buffer | Pilling Resistance on 2 × 2 Rib Stitch per JIS L1076 ICI Method |
|---|---|---|---|
| 1 | I | Phosphate | 4-4.5 |
| 2 | II | Borate | 4 |
| 3 | III | Phosphate | 4-4.5 |
| 4 | IV | Phosphate | 4-4.5 |
| 5 | Uncoated 2 × 2 rib stich | | 2-3 |

From Table 4, the results of pilling resistance of the coated merino wool fabric of 2×2 rib stitch with coating formulations comprising any of compositions of polymer binder in water (I), (II), (III) or (IV), and pH 8 buffer of phosphate or borate are excellent in comparison to the uncoated merino wool fabric.

Example 5

Variations in Proportion Between Polymer Binder in Water and Buffer in Water Table 5 below provides two different ratios of polymer binder in water (Table 1) to buffer solution (phosphate or borate) and their pilling resistance of the coated merino wool fabric on 2×2 rib stitch per JIS L1076 ICI method. The conditions and procedure of coating formation on the black 2×2 rib stitch follows those described in Example 4.

TABLE 5

| Entry | % w/w polymer binder in water (I) | % w/w of pH 8 Phosphate Buffer in Water | Pilling Resistance on 2 × 2 Rib Stitch per JIS L1076 ICI Method |
|---|---|---|---|
| 1 | 15 | 85 | 4 |
| 2 | 30 | 70 | 3.5 |
| 3 | Uncoated black 2 × 2 rib stich | | 2-2.5 |

From Table 5, the black merino wool fabric of 2×2 rib stitch coated with the coating formulation with higher polymer binder proportion had lower pilling resistance than that coated with the coating formulation with lower proportion of polymer binder (or higher buffer portion).

Example 6

Effect of Different Fabric Constructions and/or Colors on Pilling Resistance, Discoloration of Original Finish and Fiber Loss Upon Home Laundry for 15 cycles Without the Use of Laundry Net Table 6 below summarizes the pilling resistance per JIS L 1076 ICI method of single jersey knit versus 2×2 rib stitch in different colors (white, black, green, blue, and red) coated with the coating formulation according to Entry 1 in Example 5. Results of discoloration grey scale grading against the original finish of the merino wool fabric were evaluated according to ISO105-A02.

For fiber loss evaluation against home laundry cycle per JIS L0217 Method 103, the merino wool garment, without the use of laundry net, was washed in a designated washing machine per the said test standard for 5 minutes with use of ECE reference detergent, rinse for 2 minutes, then rinse for 2 minutes. The above cycle was repeated for 15 times. The washed garment was then lay flat to dry. All of the fibers that have been drained out of the hose of the washing machine and those remaining in the washing mashing were collected. They were dried and humidity was adjusted to standard condition before weight measurement. Fiber loss percentage is defined as the amount of fiber lost (g) divided by garment weight before the test (g)

TABLE 6

| Merino Wool Fabric Construction | Color | Discoloration Grey Scale Grading Against the Original Finish of Merino Wool Fabric per ISO 105-A02 | Pilling Resistance per JIS L 1076 ICI Method | | Fiber Loss (%) of 350 to 400 g of coated and finished Merino Wool Garment. No laundry net was used | |
|---|---|---|---|---|---|---|
| | | | Control | Coated | Control | Coated |
| Single Jersey Knit | White | 4.5 | 3.5 | 5 | 0.14 | 0.18 |
| | Black | 4.5 | 3.5-4 | 4.5 | 0.09 | 0.04 |
| | Green | 4.5 | 3.5 | 5 | 0.06 | 0.05 |
| | Blue | 4.5 | 4 | 5 | 0.04 | 0.04 |
| | Red | 4.5 | 4 | 4.5 | 0.09 | 0.07 |
| 2 × 2 Rib Stitch | White | 4.5 | 3 | 4.5 | 0.01 | 0.01 |
| | Black | 4.5 | 2.5 | 4.5 | 0.03 | 0.02 |
| | Green | 4.5 | 2.5-3 | 4-4.5 | 0.01 | 0.01 |
| | Blue | 4.5 | 3-3.5 | 4-4.5 | 0.03 | 0.02 |
| | Red | 4.5 | 3-3.5 | 4.5 | 0.02 | 0.01 |

Figure 3A:
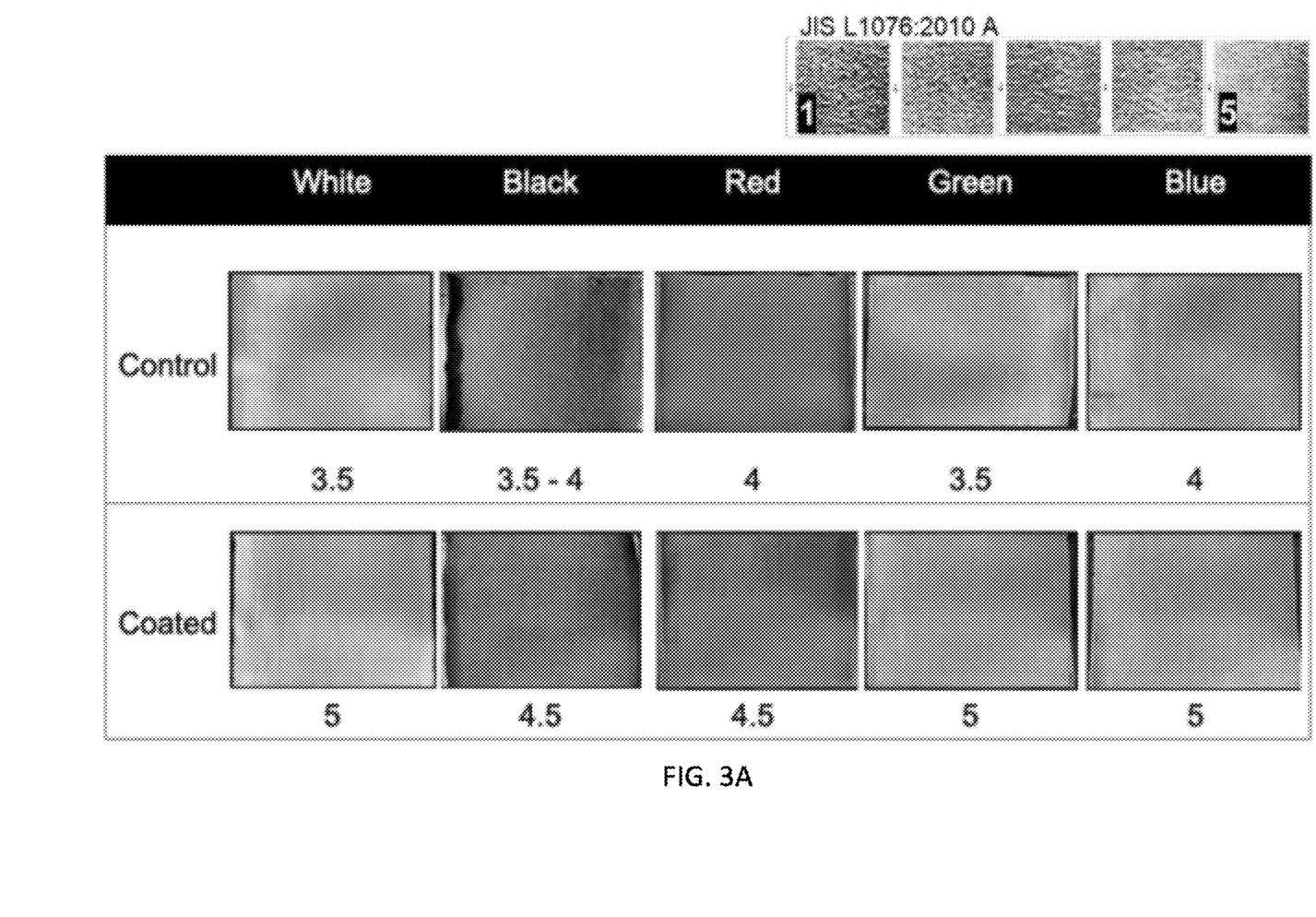
FIG. 3A shows anti-pilling performance of the present invention on single jersey knits in terms of their surface morphology according to JIS L1076 ICI method; the inset at the top right hand corner shows a series of referenced photos of surface morphology of corresponding fabrics in different grades (1.0 to 5.0) according to JIS L1076 ICI method.
Figure 3B:
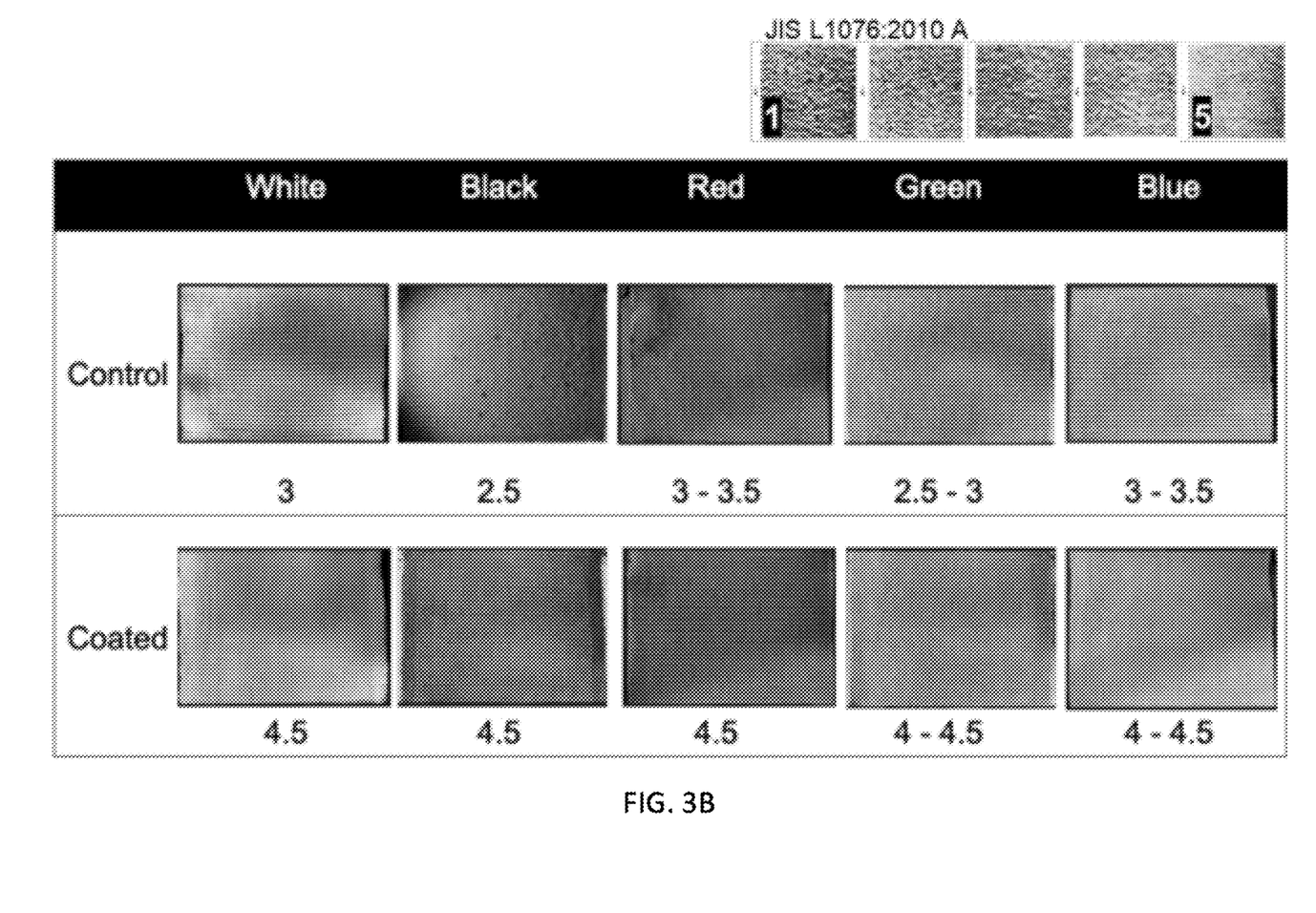
FIG. 3B shows anti-pilling performance of the present invention on 2×2 rib stitch in terms of their surface morphology according to JIS L1076 ICI method; the inset at the top right hand corner shows a series of referenced photos of surface morphology of corresponding fabrics in different grades (1.0 to 5.0) according to JIS L1076 ICI method.

FIGS. 3A and 3B shows pilling resistance grading results for single jersey knit and 2×2 rib stitch knit in different colors, respectively, coated with the coating formulation according to Entry 1 in Example 5 versus those of uncoated knits.

From Table 6, as described hereinabove, both knits of single jersey and 2×2 rib stitch coated with the coating formulation of Entry 1 in Example 5 resulted in excellent pilling resistance (grading of at least 4.0) regardless of color, and with minimal discoloration against original finish (according to grade scale grading against original finish of merino wool fabric per ISO105-A02). The coating formation on both knits of single jersey and 2×2 rib stitch does not significantly impact on the fiber loss of coated and finished merino wool garment upon home laundry for 15 cycles without the use of laundry net. Notwithstanding the construction method or color, the merino wool fabric coated with the coating formulation of the present invention has excellent pilling resistance, with minimal discoloration against original finish, and no significant fiber loss upon home laundry for 15 cycles without the use of laundry net.

Example 7

Comparative Composition of Polymer Binder in Water (V)

Table 7 below summarizes the comparative composition of polymer binder in water (V) with respect to (I) described in Example 1.

TABLE 7

| Material | Amount (vol./weight) | Moles |
|---|---|---|
| Isophorone diisocyanate | 5.8 mL/6.1 g | 27.7 mmol |
| 1,6-hexamethylene diisocyanate | 1.1 mL/1.2 g | 6.87 mmol |
| 3-Methyl-1-phenyl-2-phospholene-1 oxide | 33.1 mg | 0.172 mmol |
| Triethylene glycol monomethyl ether | 2.8 mL/2.9 g | |
| Dibutyltin(IV) Dilaurate | 0.28 mg | |
| Water | 17 mL | |

The main difference between compositions (V) and (I) is in the choice of water dispersing agent. Triethylene glycol monomethyl ether was used in composition (V) instead of polyethylene glycol monomethyl ether (MPEG) used in composition (I). The rest of the components and reaction conditions for composition (V) are substantially the same as those used in (I). This composition does not form a homogeneous solution of polymer binder in water and therefore not applicable as a component of a coating formulation for providing an anti-pilling merino wool fabric.

Example 8

Comparative Composition of Polymer Binder in Water (VI)

Table 8 below summarizes the comparative composition of polymer binder in water (VI) with respect to (I) described in Example 1.

TABLE 8

| Material | Amount (vol./weight) | Moles |
|---|---|---|
| Isophorone diisocyanate | 5.4 mL/5.7 g | 25.7 mmol |
| 1,6-hexamethylene diisocyanate | 1.0 mL/1.1 g | 6.24 mmol |
| 3-Methyl-1-phenyl-2-phospholene-1 oxide | 30.7 mg | 0.160 mmol |
| Polyethylene glycol monomethyl ether 1000 | 16 g | |
| Dibutyltin(IV) Dilaurate | 1.6 mg | |
| Water | 17 mL | |

Polyethylene glycol monomethyl ether 1000 (MPEG 1000) was used in composition (VI) instead of polyethylene glycol monomethyl ether 550 (MPEG 550) used in (I). The rest of the components and reaction conditions for composition (VI) are substantially the same as those used in (I). This composition does not form a homogeneous solution of polymer binder in water and therefore not applicable as a component of a coating formulation for providing an anti-pilling merino wool fabric.

INDUSTRIAL APPLICABILITY

The present invention is applicable to wool fabric including merino wool fabric, in particular, a finished wool fabric or a finished garment, in order to impart pilling resistance of at least 4 according to certain standard, whilst preventing discoloration and fiber loss upon laundry.

The invention claimed is:

1. An anti-pilling merino wool fabric with pilling resistance of at least 3.5 by JIS L1076 ICI method and less than 0.2% w/w of fiber loss upon home laundry for 15 cycles without the use of laundry net, the anti-pilling merino wool fabric being treated with a polycarbodiimide binder to crosslink polypeptides of the merino wool fabric comprising:
dipping a merino wool fabric in a polycarbodiimide binder plus buffer solution followed by removing excess solution and drying, the polycarbodiimide binder being formed by:
reacting isophorone diisocyanate and 1,6-hexamethylene diisocyanate with a first catalyst to form a first reaction product;
reacting the first reaction product with a polyethylene glycol monomethyl ether water dispersing agent and a second catalyst to form the polycarbodiimide binder and mixing the polycarbodiimide binder with a buffer solution to form the polycarbodiimide binder formulation wherein the binder plus buffer solution comprises approximately 8 to 30% w/w polymer binder in water and approximately 70 to 92% w/w buffer in water, and wherein the buffer is selected from phosphate or borate.

2. The anti-pilling merino wool fabric of claim 1, wherein the first catalyst is 3-methyl-1-phenyl-2-phospholene-1 oxide and the second catalyst is dibutyltin(IV) dilaurate.

3. The anti-pilling merino wool fabric of claim 2, wherein the first catalyst of 3-methyl-1-phenyl-2-phospholene-1 oxide is at a mole concentration of approximately 0.2 to 1.0% with respect to the isophorone diisocyanate and 1,6-hexamethylene diisocyanate.

4. The anti-pilling merino wool fabric of claim 2, wherein dibutyltin(IV) dilaurate is at a concentration of approximately 0.01% w/w with respect to the water dispersing agent.

5. The anti-pilling merino wool fabric of claim 1, wherein the water dispersing agent is a polyethylene glycol monomethyl ether.

6. The anti-pilling merino wool fabric of claim 1, wherein the buffer is selected from phosphate or borate salts, and is adjusted to approximately pH 8.0.

7. The anti-pilling merino wool fabric of claim 1, wherein isophorone diisocyanate and 1,6-hexamethylene diisocyanate are in a mole ratio of 4:1.

8. A garment comprising the anti-pilling merino wool fabric of claim 1.

9. A method of fabricating the anti-pilling merino wool fabric of claim 1, the method comprising:
providing a merino wool fabric;
preparing a coating formulation including:
mixing a first diisocyanate comprising isophorone diisocyanate and a second diisocyanate comprising 1,6-hexamethylene diisocyanate in a first mole ratio with a first catalyst at a second mole ratio with respect to the first and second diisocyanates to form a first reaction product,
reacting the first reaction product with a polyethylene glycol monomethyl ether water dispersing agent and a second catalyst to form the polycarbodiimide binder and mixing the polycarbodiimide binder with a buffer solution to form the polycarbodiimide binder formulation as a coating solution;
wherein the binder plus buffer solution comprises approximately 8 to 30% w/w polymer binder in water and approximately 70 to 92% w/w buffer in water, and wherein the buffer is selected from phosphate or borate formed to obtain the coating formulation;
applying the coating formulation to the merino wool fabric; and
removing excess coating formulation from the merino wool fabric followed by drying.

10. The method of claim 9, wherein the first mole ratio between the first and second diisocyanates is 4:1.

11. The method of claim 9, wherein the first catalyst is selected from 3-methyl-1-phenyl-2-phospholene-1 oxide.

12. The method of claim 9, wherein the second mole ratio of the first catalyst to the first and second diisocyanates is from approximately 0.2% to 1%.

13. The method of claim 9, wherein the water dispersing agent is a polyethylene glycol monomethyl ether.

14. The method of claim 9, wherein the first weight percentage of the water dispersing agent is about 126% to the total weight of the first and second diisocyanates.

15. The method of claim 9, wherein the second catalyst is selected from dibutyltin(IV) dilaurate.

16. The method of claim 9, wherein the second weight percentage of the second catalyst is about 0.01% to the weight of the water dispersing agent.

17. The method of claim 9, wherein the first and second diisocyanates are mixed by stirring until a clear solution is obtained, followed by heating the mixture up to 160 degrees Celsius for approximately 35 to 50 minutes, and then the mixture is cooled to about 120 degrees Celsius to obtain the first solution.

18. The method of claim 9, wherein the second solution is obtained by first mixing the second catalyst with the water dispersing agent until a homogenous solution is formed followed by adding the homogenous solution into the first solution and stirring for about 2 hours at about 120 degrees Celsius.

19. The method of claim 9, wherein water is added dropwisely with stirring into the second solution after the second solution is cooled to 80 degrees Celsius until a clear homogenous solution is obtained and about 63% w/w water content in the polymer binder is reached.

20. The method of claim 9, wherein the fourth solution including buffer in water of at least about 70% w/w with respect to the third solution is added into the third solution followed by mixing until a homogenous solution is formed as the coating formulation.

* * * * *